United States Patent
Liu et al.

(10) Patent No.: US 12,463,299 B2
(45) Date of Patent: Nov. 4, 2025

(54) ELECTRODE ASSEMBLY AND BATTERY CELL

(71) Applicant: CONTEMPORARY AMPEREX TECHNOLOGY (HONG KONG) LIMITED, Hong Kong (CN)

(72) Inventors: Huihui Liu, Ningde (CN); Hui Gu, Ningde (CN); Jingyu Cao, Ningde (CN); Lin Ma, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 963 days.

(21) Appl. No.: 17/565,873

(22) Filed: Dec. 30, 2021

(65) Prior Publication Data

US 2022/0123444 A1   Apr. 21, 2022

Related U.S. Application Data

(63) Continuation of application No. PCT/CN2020/102832, filed on Jul. 17, 2020.

(30) Foreign Application Priority Data

Aug. 14, 2019   (CN) .......................... 201910749926.3

(51) Int. Cl.
*H01M 50/536* (2021.01)
*H01M 4/36* (2006.01)
(Continued)

(52) U.S. Cl.
CPC ......... *H01M 50/536* (2021.01); *H01M 4/366* (2013.01); *H01M 4/628* (2013.01); *H01M 10/0525* (2013.01); *H01M 50/543* (2021.01)

(58) Field of Classification Search
CPC .. H01M 50/536; H01M 50/543; H01M 4/366; H01M 4/628; H01M 10/0525; H01M 50/531; H01M 50/538
See application file for complete search history.

(56) References Cited

U.S. PATENT DOCUMENTS

2016/0359189 A1* 12/2016 Fukatsu ................ H01M 4/133
2018/0366786 A1   12/2018 Fujii
(Continued)

FOREIGN PATENT DOCUMENTS

CN   1525591 A    9/2004
CN   101662011 A  3/2010
(Continued)

OTHER PUBLICATIONS

Corrosion of Aluminum (Year: 2020).*
(Continued)

*Primary Examiner* — Marla D Mcconnell
(74) *Attorney, Agent, or Firm* — Scully, Scott, Murphy & Presser, P.C.

(57) ABSTRACT

This application provides an electrode assembly and a battery cell. The battery cell includes an electrode assembly, a housing, and a first electrode terminal. The housing includes an accommodation cavity. The electrode assembly is accommodated in the accommodation cavity, and the first electrode terminal is disposed in the housing. The electrode assembly includes a first electrode plate, a second electrode plate, and a separator. The separator separates the first electrode plate from the second electrode plate. The first electrode plate includes a first current collector, a first active material layer, and an insulation layer. The first current collector includes a first body portion and a first tab extending from the first body portion.

9 Claims, 8 Drawing Sheets

(51) Int. Cl.
    *H01M 4/62*       (2006.01)
    *H01M 10/0525*    (2010.01)
    *H01M 50/543*     (2021.01)

(56) References Cited

U.S. PATENT DOCUMENTS

| | | | |
|---|---|---|---|
| 2019/0157651 A1* | 5/2019 | Otohata | H01M 10/0463 |
| 2019/0393511 A1 | 12/2019 | Zhou et al. | |
| 2020/0006776 A1 | 1/2020 | Zhou et al. | |
| 2020/0075920 A1 | 3/2020 | Murai | |

FOREIGN PATENT DOCUMENTS

| | | |
|---|---|---|
| CN | 105103335 A | 11/2015 |
| CN | 105244470 A | 1/2016 |
| CN | 106463761 A | 2/2017 |
| CN | 206250283 U | 6/2017 |
| CN | 206432317 U | 8/2017 |
| CN | 207705300 U | 8/2018 |
| CN | 108598491 A | 9/2018 |
| CN | 108886128 A | 11/2018 |
| CN | 208507818 U | 2/2019 |
| CN | 209183628 U | 7/2019 |
| CN | 110178247 A | 8/2019 |
| CN | 209981386 U | 1/2020 |
| CN | 210535760 U | 5/2020 |
| CN | 111326699 A | 6/2020 |
| EP | 2485298 A1 | 8/2012 |
| EP | 2858145 A1 | 4/2015 |
| EP | 2860798 A1 | 4/2015 |
| KR | 20150098445 A | 8/2015 |
| KR | 20160125720 A | 11/2016 |
| WO | 2017174374 A1 | 10/2017 |

OTHER PUBLICATIONS

Materials, Design, and Manufacturing for Lightweight Vehicles (Year: 2021).*
International Search Report dated Oct. 27, 2020 issued in PCT/CN2020/102832.
Extended European search report dated May 23, 2022 received in European Patent Application No. 20852469.4.
Notice of Allowance dated Feb. 10, 2023 received in European Patent Application No. 20852469.4.

* cited by examiner

ELECTRODE ASSEMBLY AND BATTERY CELL

CROSS-REFERENCE TO RELATED APPLICATIONS

The present application is a continuation of International Application No. PCT/CN2020/102832, filed on Jul. 17, 2020, which claims priority to Chinese Patent Application No. 201910749926.3, filed on Aug. 14, 2019, both of which are hereby incorporated by reference in their entireties.

TECHNICAL FIELD

This application relates to the field of batteries, and in particular, to an electrode assembly and a battery cell.

BACKGROUND

A secondary battery includes an electrode assembly, a housing, and electrode terminals. The electrode assembly is accommodated in the housing, and the electrode terminals are disposed in the housing. The electrode assembly includes a first electrode plate, a second electrode plate, and a separator. The separator separates the first electrode plate from the second electrode plate. Each electrode plate of the electrode assembly includes a tab. The tab is electrically connected to the electrode terminals. However, in a process of assembling the secondary battery, because the tab itself is very thin, the tab is very likely to be pressed in between the first electrode plate and the second electrode plate to cause a short-circuit risk.

SUMMARY

In view of problems in background technologies, a plurality of aspects of this application provide an electrode assembly and a battery cell to reduce short-circuit risks and improve safety performance.

A first aspect of this application provides a battery cell. The battery cell includes an electrode assembly, a housing, and a first electrode terminal. The housing includes an accommodation cavity. The electrode assembly is accommodated in the accommodation cavity, and the first electrode terminal is disposed in the housing. The electrode assembly includes a first electrode plate, a second electrode plate, and a separator. The separator separates the first electrode plate from the second electrode plate. The first electrode plate includes a first current collector, a first active material layer, and an insulation layer. The first current collector includes a first body portion and a first tab extending from the first body portion. The first active material layer is at least partially coated on a surface of the first body portion. The first tab protrudes out of the first body portion and is electrically connected with the first electrode terminal. The insulation layer is at least partially coated on a surface of the first tab, and an elastic modulus of the insulation layer is less than an elastic modulus of the first tab.

The number of the first tab is more than one, and the insulation layer is coated at partial regions of both surfaces of each first tab.

The housing includes a housing body and a top cover plate. The housing body includes an opening. The top cover plate is connected to the housing body and covers the opening of the housing body. The first electrode terminal is disposed on the top cover plate. The battery cell further includes a first current collecting member. The first tab is electrically connected to the first electrode terminal by the first current collecting member. The first tab is welded to the first current collecting member and forms a weld region. The first tab includes a connecting portion extending from one end of the first body portion, and the connecting portion is connected between the weld region and the first body portion. The insulation layer is at least partially coated on the connecting portion.

Along an extension direction of the first tab, the insulation layer is spaced apart from the weld region.

Along the extension direction of the first tab, a ratio of a length of a region coated with the insulation layer in the connecting portion to a total length of the connecting portion is 0.3 to 0.9.

The connecting portion is bent at a region uncoated with the insulation layer.

The elastic modulus of the insulation layer is 5 MPa to 60 MPa, and a thickness of the insulation layer is 10 µm to 60 µm.

The insulation layer includes an inorganic filler and a binder. A weight ratio of the inorganic filler to the binder is 4.1 to 8.2.

A swelling ratio of the insulation layer is less than 50%.

The insulation layer includes a first part and a second part. The first part is coated on the surface of the first body portion and connected to an end of the first active material layer, the end being close to the first tab. The second part extends from an end of the first part and is coated on the surface of the first tab, the end being away from the first active material layer.

The second electrode plate includes a second current collector and a second active material layer. The second current collector includes a second body portion and a second tab extending from the second body portion. The second active material layer is coated on a surface of the second body portion. The second tab protrudes out of the second body portion. Along a direction pointing to the first tab from the first body portion, an end of the second active material layer goes beyond a joint between the first part and the first active material layer but does not go beyond an end of the first part, the end being away from the first active material layer.

The second electrode plate further includes a third active material layer. The third active material layer is coated on a surface of the second tab and connected to the second active material layer. The first tab and the second tab are located on an identical side of the electrode assembly. Along a direction pointing to the first tab from the first body portion, an end of the third active material layer, which is away from the second active material layer, goes beyond the end of the first part, which is away from the first active material layer.

A second aspect of this application provides an electrode assembly, including a first electrode plate and a second electrode plate.

The first electrode plate includes a first current collector, a first active material layer, and an insulation layer. The first current collector includes a first body portion and a first tab extending from the first body portion. The first active material layer is at least partially coated on a surface of the first body portion. The first tab protrudes out of the first body portion.

The insulation layer is at least partially coated on a surface of the first tab. An elastic modulus of the insulation layer is less than an elastic modulus of the first tab.

Optionally, the number of the first tab is more than one, and the insulation layer is coated at root regions of both surfaces of each first tab, the root regions being close to the first body portion.

Optionally, the elastic modulus of the insulation layer is 5 MPa to 60 MPa, and a thickness of the insulation layer is 10 μm to 60 μm.

Optionally, the insulation layer includes an inorganic filler and a binder. A weight ratio of the inorganic filler to the binder is 4.1 to 8.2.

Optionally, a swelling ratio of the insulation layer is less than 50%.

Optionally, the insulation layer includes a first part and a second part. The first part is coated on the surface of the first body portion and connected to an end of the first active material layer, the end being close to the first tab. The second part extends from an end of the first part and is coated on the surface of the first tab, the end being away from the first active material layer.

Optionally, the second electrode plate includes a second current collector and a second active material layer. The second current collector includes a second body portion and a second tab extending from the second body portion.

The second active material layer is coated on a surface of the second body portion. The second tab protrudes out of the second body portion.

Along a direction pointing to the first tab from the first body portion, an end of the second active material layer goes beyond a joint between the first part and the first active material layer but does not go beyond an end of the first part, the end being away from the first active material layer.

Optionally, the second electrode plate further includes a third active material layer. The third active material layer is coated on a surface of the second tab and connected to the second active material layer.

The first tab and the second tab are located on an identical side of the electrode assembly.

Along a direction pointing to the first tab from the first body portion, an end of the third active material layer, which is away from the second active material layer, goes beyond the end of the first part, which is away from the first active material layer.

With respect to the electrode assembly and the battery cell described above, the insulation layer in the electrode assembly serves a function of insulative protection. Even if the first tab is inserted between the first electrode plate and the second electrode plate, the insulation layer can still effectively separate the first tab from the second electrode plate, thereby reducing short-circuit risks and improving safety performance. In contrast with the first tab, the elastic modulus of the insulation layer is small. Therefore, in a process of assembling the battery cell, the insulation layer does not interfere with tucking or bending of the first tab, thereby reducing a space occupied by the first tab and ensuring an energy density of the battery cell.

Figure 1:
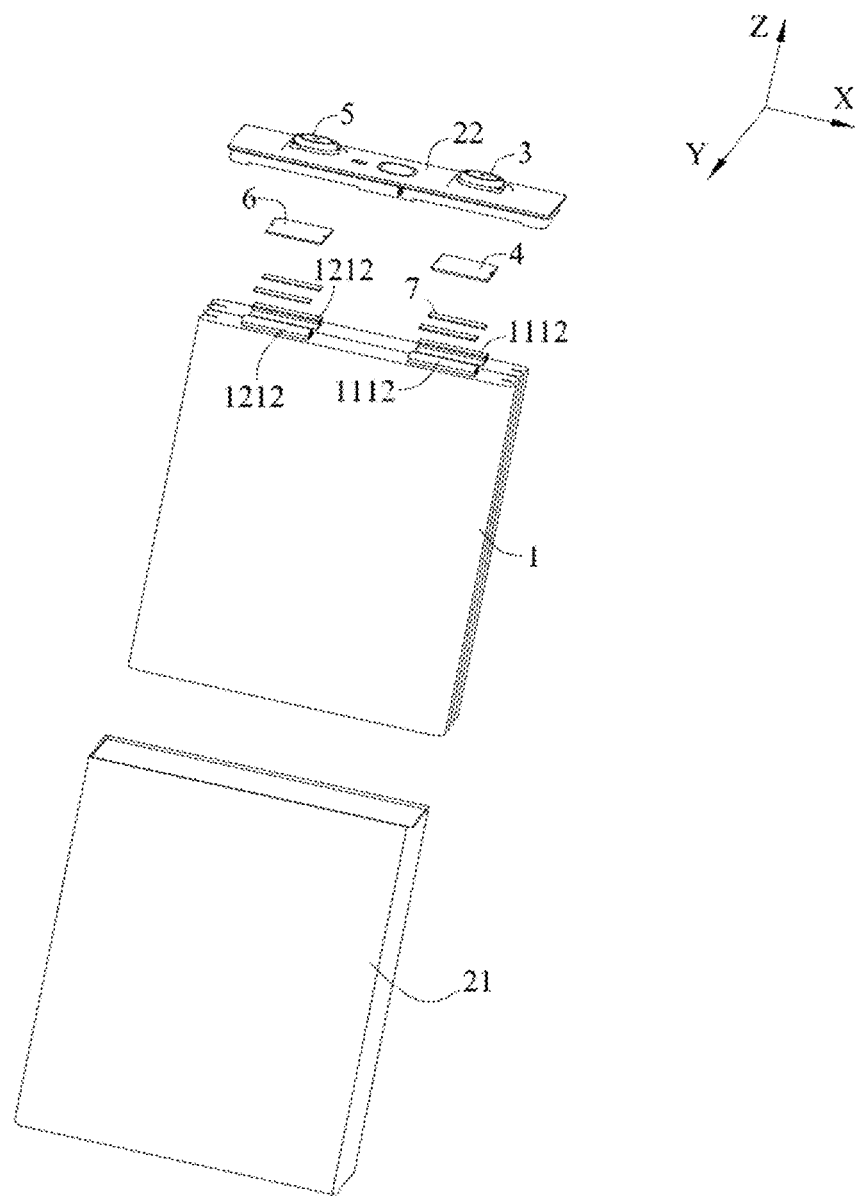
FIG. 1 is an exploded view of a secondary battery according to an embodiment of this application.

Reference numerals are as follows:
1: Electrode assembly;
11: First electrode plate;
111: First current collector;
1111: First body portion;
1112: First tab;
1112a: Connecting portion;
112: First active material layer;
113: Insulation layer;
113a: First part;
113b: Second part;
12: Second electrode plate;
121: Second current collector;
1211: Second body portion;
1212: Second tab;
122: Second active material layer;
123: Third active material layer;
13: Separator;
2: Housing;
21: Housing body;
22: Top cover plate;
3: First electrode terminal;
4: First current collecting member;
5: Second electrode terminal;
6: Second current collecting member;
7: Weld protection sheet;
W: Weld region;
X: Length direction;
Y: Thickness direction; and
Z: Height direction.

DETAILED DESCRIPTION OF EMBODIMENTS

To make the objectives, technical solutions, and advantages of this application clearer, the following describes this application in further detail with reference to accompanying drawings and embodiments. Understandably, the specific embodiments described herein are merely intended to explain this application, but are not intended to limit this application.

In the context of this application, unless otherwise expressly specified, the terms "first", "second", and "third" are for the sole purpose of description rather than indicating or implying any order of preference; the term "a plurality of"

means two or more (including two); unless otherwise expressly specified, the term "connect" needs to be understood in a broad sense. For example, a "connection" may be a fixed connection, or a detachable connection, or an integrated connection, or an electrical connection or signal connection; or may be a direct connection or an indirect connection implemented through an intermediate medium. A person of ordinary skill in the art can understand the specific meanings of the terms in this application according to the context.

Understandably, in the context of this application, directional terms such as "on", "above", "under", and "below" described in the embodiments of this application are described from a perspective shown in the drawings, and are not to be understood as a limitation on the embodiments of this application. The following describes this application in further detail with reference to specific embodiments and accompanying drawings.

Figure 2:
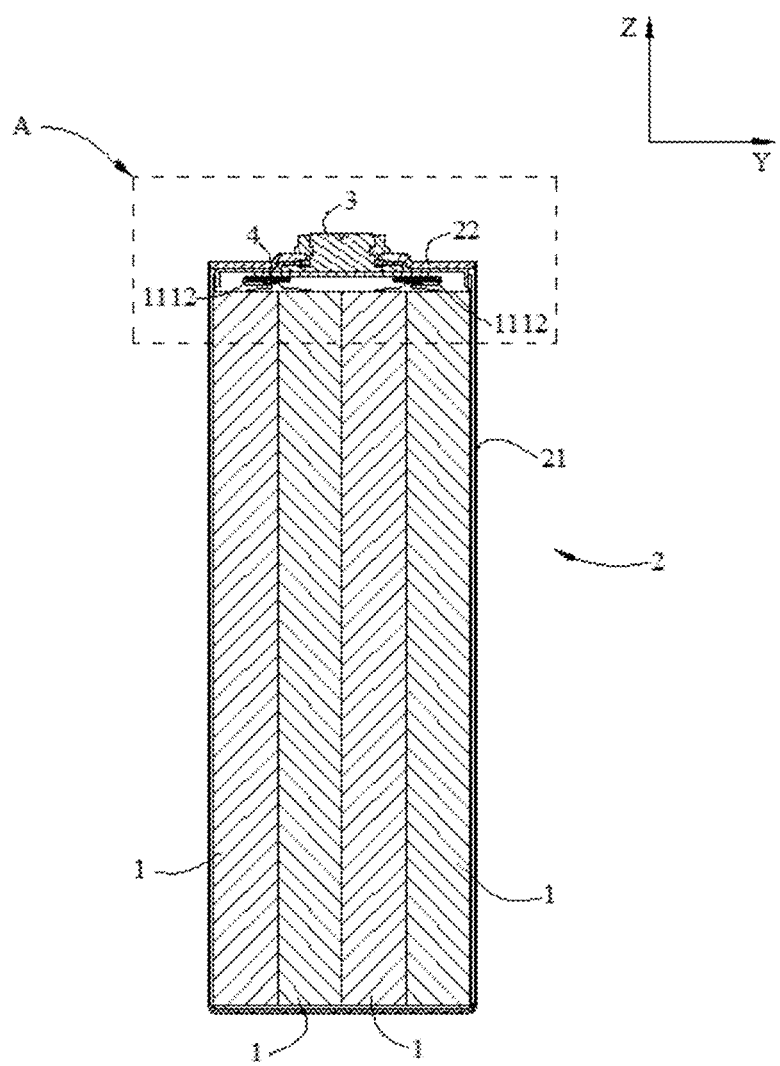
FIG. 2 is a cross-sectional view of a secondary battery according to another embodiment of this application.
Figure 3:
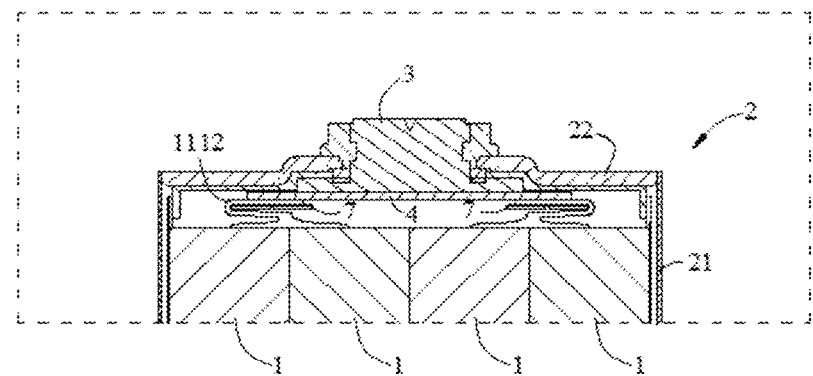
FIG. 3 is a local detailed view of a part A of the secondary battery shown in FIG. 2.

Referring to FIG. 1 and FIG. 2, a secondary battery according to an embodiment of this application includes an electrode assembly 1, a housing 2, a first electrode terminal 3, and a second electrode terminal 5.

Figure 4:
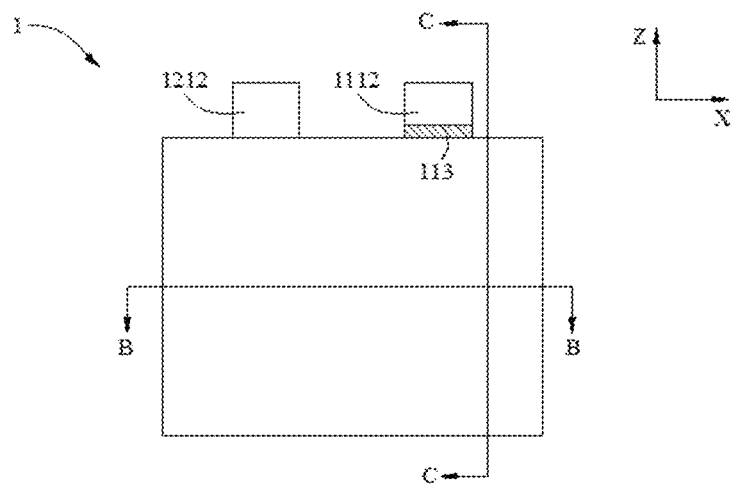
FIG. 4 is a schematic diagram of an electrode assembly of a secondary battery according to another embodiment of this application.
Figure 5:
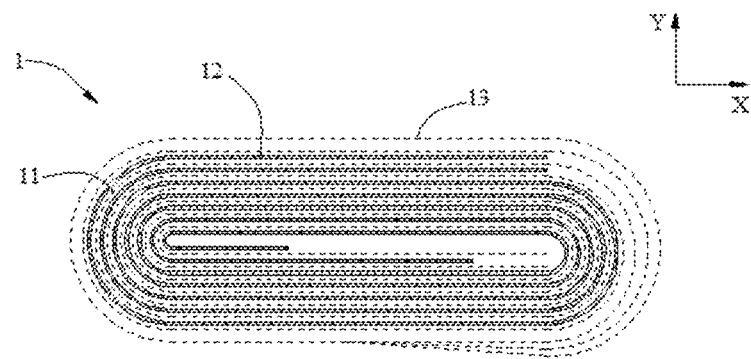
FIG. 5 is a cross-sectional view of the electrode assembly shown in FIG. 4 and sectioned along a B-B line.
Figure 6:
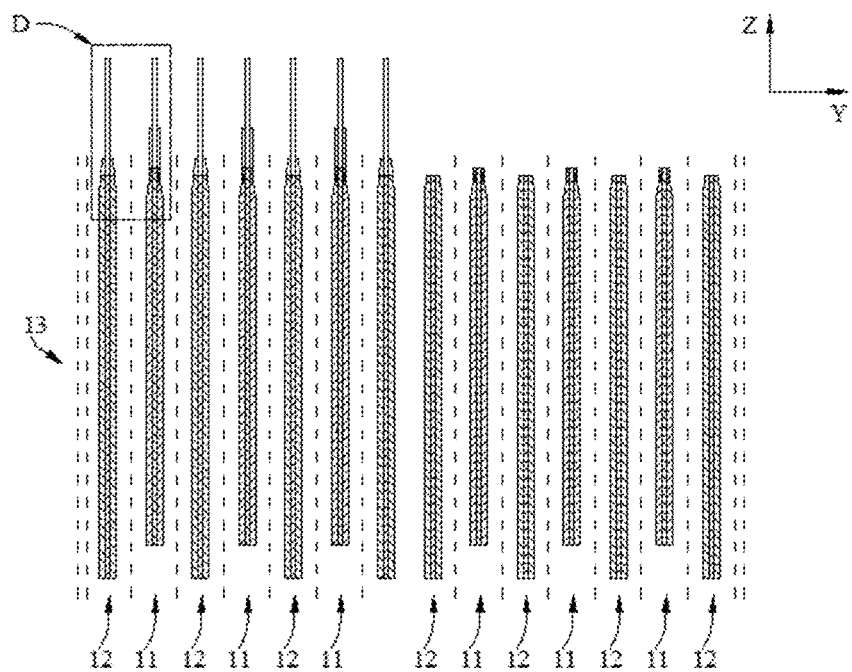
FIG. 6 is a cross-sectional view of the electrode assembly shown in FIG. 4 and sectioned along a C-C line.

The electrode assembly 1 is a core member for the secondary battery to implement functions of charging and discharging. Referring to FIG. 4 to FIG. 6, the electrode assembly 1 includes a first electrode plate 11, a second electrode plate 12, and a separator 13. The separator 13 separates the first electrode plate 11 from the second electrode plate 12.

The electrode assembly 1 may be a jelly-roll structure. Specifically, there are one first electrode plate 11 and one second electrode plate 12, and the first electrode plate 11 and the second electrode plate 12 are strap-shaped structures. The first electrode plate 11, the separator 13, and the second electrode plate 12 are sequentially stacked and wound for at least two coils to form the electrode assembly 1. The electrode assembly 1 may be flat.

Alternatively, the electrode assembly 1 may be a stacked structure. Specifically, a plurality of first electrode plates 11 are disposed, and a plurality of second electrode plates 12 are disposed. The plurality of first electrode plates 11 and the plurality of second electrode plates 12 are alternately stacked. The separator 13 separates the first electrode plate 11 from the second electrode plate 12.

The housing 2 includes an accommodation cavity, and the electrode assembly 1 and an electrolytic solution are accommodated in the accommodation cavity. The housing 2 is configured to protect the electrode assembly 1 exteriorly.

In an embodiment, the secondary battery is a pouch-type battery, and the housing 2 may be a packaging bag made of an aluminum plastic film.

In another embodiment, the secondary battery is a hard-case battery. Specifically, the housing 2 includes a housing body 21 and a top cover plate 22. The housing body 21 includes an opening. The top cover plate 22 is connected to the housing body 21 and covers the opening of the housing body 21. The housing body 21 may be in a hexahedral shape or another shape. The housing body 21 forms an accommodation cavity interiorly to accommodate the electrode assembly 1 and the electrolytic solution. The housing body 21 forms the opening at one end, and the electrode assembly 1 can be placed into the accommodation cavity of the housing body 21 through the opening. The housing body 21 may be made of a conductive metal material. Optionally, the housing body 21 is made of aluminum or an aluminum alloy. The top cover plate 22 is disposed on the housing body 21 and covers the opening of the housing body 21 to seal the electrode assembly 1 in the housing body 21. The top cover plate 22 may be a metal plate, and is connected to the housing body 21 by welding.

The first electrode terminal 3 and the second electrode terminal 5 are disposed in the housing 2. For a hard-case battery, the first electrode terminal 3 and the second electrode terminal 5 are disposed on the top cover plate 22 of the housing 2. The secondary battery further includes a first current collecting member 4 and a second current collecting member 6. The first electrode plate 11 is electrically connected to the first electrode terminal 3 by the first current collecting member 4. The second electrode plate 12 is electrically connected to the second electrode terminal 5 by the second current collecting member 6.

The first electrode plate 11 includes a first current collector 111 and a first active material layer 112. The first current collector 111 includes a first body portion 1111 and a first tab 1112 extending from the first body portion 1111. The first active material layer 112 is at least partially coated on a surface of the first body portion 1111. The first tab 1112 protrudes out of the first body portion 1111 and is electrically connected with the first electrode terminal 3. A plurality of first tabs 1112 are disposed.

The second electrode plate 12 includes a second current collector 121 and a second active material layer 122. The second current collector 121 includes a second body portion 1211 and a second tab 1212 extending from the second body portion 1211. The second active material layer 122 is coated on a surface of the second body portion 1211. The second tab 1212 protrudes out of the second body portion 1211 and is electrically connected to the second electrode terminal 5. A plurality of second tabs 1212 are disposed.

The first electrode plate 11 may be a positive electrode plate, and the second electrode plate 12 may be a negative electrode plate. Correspondingly, the first current collector 111 is an aluminum foil, and the first active material layer 112 includes a ternary material, lithium manganate, or lithium iron phosphate. The second current collector 121 is a copper foil, and the second active material layer 122 includes graphite or silicon.

In this embodiment of this application, after the electrode assembly 1 is wound into shape, a plurality of first tabs 1112 are stacked together and welded to the first current collecting member 4. However, after completion of the welding, unwelded regions of the plurality of first tabs 1112 are in a dispersed state. In addition, because the first tabs 1112 are relatively thin, the first tabs 1112 are very likely to be deformed and pressed in between the first electrode plate 11 and the second electrode plate 12 in a process of assembling the secondary battery, thereby causing a short-circuit risk.

Therefore, to reduce the short-circuit risk, an insulation layer 113 is disposed according to this embodiment of this application. Specifically, referring to FIG. 6 to FIG. 8, the insulation layer 113 is at least partially coated on a surface of each first tab 1112. The insulation layer 113 serves a function of insulative protection. Even if the first tab 1112 is inserted between the first electrode plate 11 and the second electrode plate 12, the insulation layer 113 can still effectively separate the first tab 1112 from the second electrode plate 12, thereby reducing short-circuit risks and improving safety performance.

In addition, in a process of assembling the secondary battery, the first tab 1112 needs to be tucked and bent. If an elastic modulus of the insulation layer 113 is relatively large, it will be difficult to bend the first tab 1112. Consequently, the first tab 1112 occupies a relatively large space, and an energy density of the secondary battery is reduced. Therefore, optionally, the elastic modulus of the insulation layer 113 is less than the elastic modulus of the first tab 1112.

In this embodiment of this application, in contrast with the first tab 1112, the elastic modulus of the insulation layer 113 is small. Therefore, in a process of assembling the secondary battery, the insulation layer 113 does not interfere with tucking or bending of the first tab 1112, thereby reducing a space occupied by the first tab 1112 and ensuring the energy density of the secondary battery.

Each first tab 1112 includes two oppositely disposed surfaces. The insulation layer 113 is coated on each surface of each first tab 1112. To prevent the insulation layer 113 from interfering with the welding between the first tab 1112 and the first current collecting member 4, the insulation layer 113 is coated in partial regions of each surface of each first tab 1112. This embodiment of this application can reduce risks of contact between each first tab 1112 and the second tab 12.

In a process of assembling the secondary battery, a root region of the first tab 1112, which is close to the first body portion 1111, is at the highest risk of bending and deformation. Therefore, the insulation layer 113 covers the root region of the first tab 1112, which is close to the first body portion 1111.

The insulation layer 113 is connected to the first active material layer 112 to reduce risks of peel-off of the insulation layer 113.

Figure 7:
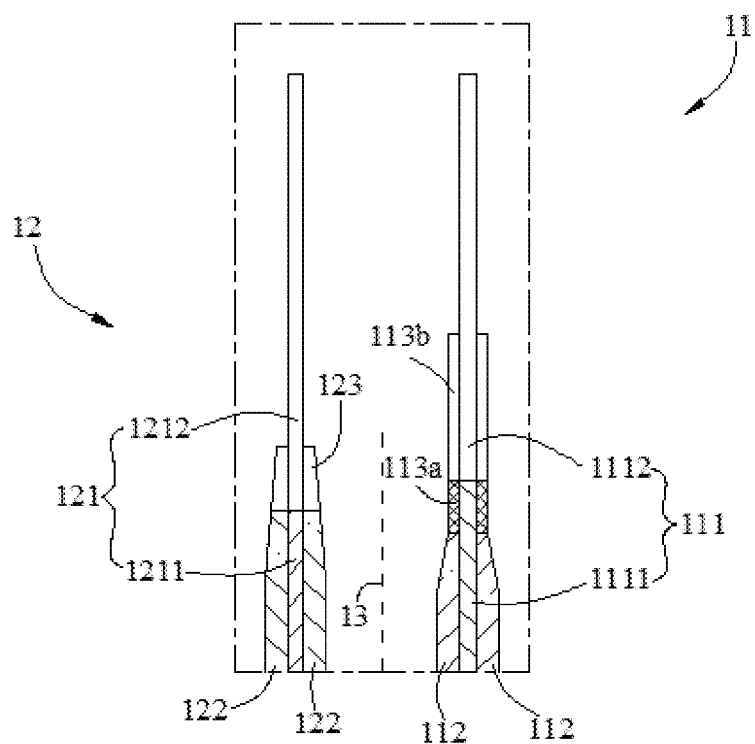
FIG. 7 is a local detailed view of a part D of the electrode assembly shown in FIG. 6.
Figure 8:
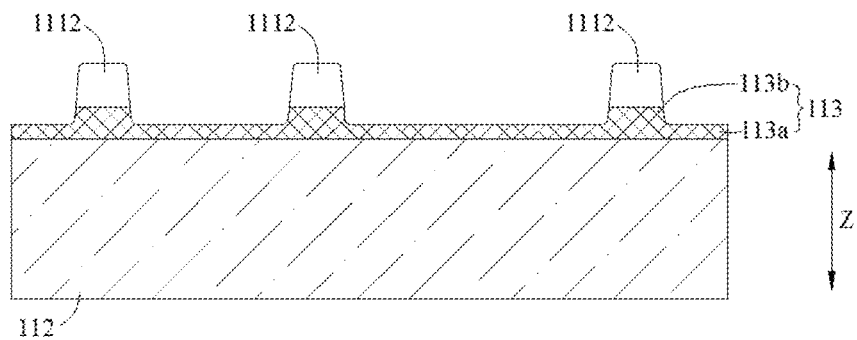
FIG. 8 is a schematic diagram of an expanded state of a first electrode plate of the electrode assembly shown in FIG. 6.
Figure 9:
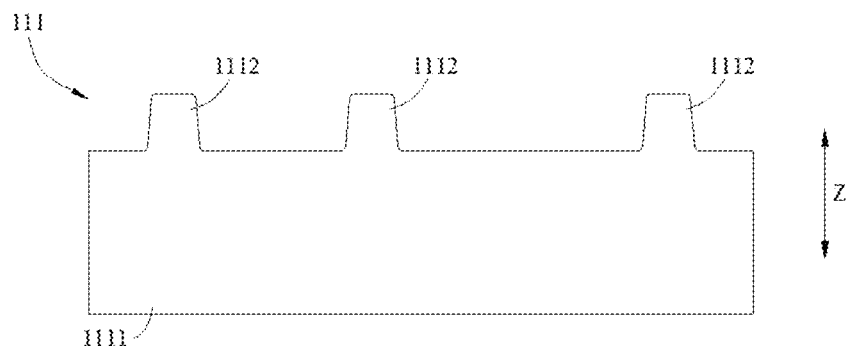
FIG. 9 is another schematic diagram of the first electrode plate shown in FIG. 8, with a first active material layer and an insulation layer being omitted.

Referring to FIG. 7 and FIG. 8, the insulation layer 113 includes a first part 113a and a second part 113b. The first part 113a is coated on the surface of the first body portion 1111 and connected to an end of the first active material layer 112, the end being close to the first tab 1112. The second part 113b extends from an end of the first part 113a and is coated on the surface of the first tab 1112, the end being away from the first active material layer 112. The second part 113b can cover the root region of the first tab 1112 and effectively reduce risks of contact between the root region of the first tab 1112 and the second active material layer 122, the root region being close to the first body portion 1111.

The insulation layer 113 includes an inorganic filler and a binder. The inorganic filler includes one or more of boehmite, aluminum oxide, magnesium oxide, titanium dioxide, zirconium oxide, silicon dioxide, silicon carbide, boron carbide, calcium carbonate, aluminum silicate, calcium silicate, potassium titanate, or barium sulfate. The binder includes one or more of polyvinylidene difluoride, polyacrylonitrile, polyacrylic acid, polyacrylate, polyacrylic acid-acrylate, polyacrylonitrile-acrylic acid, or polyacrylonitrile-acrylate.

Figure 10:
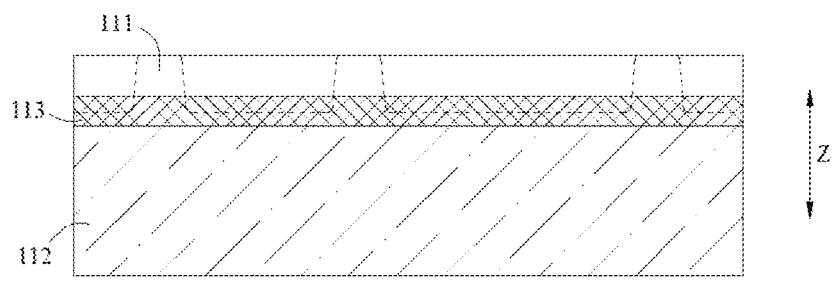
FIG. 10 is a schematic diagram of the first electrode plate shown in FIG. 8 before shaping.
Figure 11:
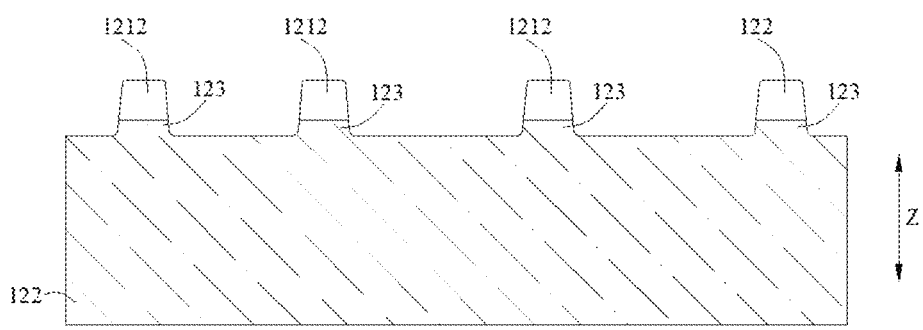
FIG. 11 is a schematic diagram of an expanded state of a second electrode plate shown in FIG. 6.

The first electrode plate 11 according to this embodiment of this application may be prepared according to the following steps:

(i) mixing a ternary material (for example, $LiNi_{0.5}Co_{0.2}Mn_{0.3}O_2$ (NCM523)), acetylene black as a conductive agent, and a binder (for example, polyvinylidene difluoride (PVDF)), adding a solvent (for example, N-methyl-pyrrolidone (NMP)), and stirring under the action of a vacuum mixer until the system is homogeneous so as to obtain a positive slurry;

(ii) mixing the boehmite and the polyvinylidene difluoride to obtain an insulation slurry;

(iii) as shown in FIG. 10, coating the positive slurry and the insulation slurry onto a surface of an aluminum foil, so that the positive slurry is cured to form the first active material layer 112 and the insulation slurry is cured to form the insulation layer 113; and (iv) cutting along a dashed line in FIG. 10 to form the first tab 1112, so as to make the first electrode plate 11.

In step (iv), a proper distance is kept between a cutter and the first active material layer 112 to prevent the cutter from generating an acting force on the first active material layer 112 due to a process error and to prevent an active material in the first active material layer 112 from peeling off. In addition, when the cutter cuts on the insulation layer 113, burrs formed on a cutting edge can be reduced effectively, and therefore, risks of piercing the separator 13 by the burrs are reduced.

In a process of using the battery, lithium ions of the first active material layer 112 pass through the separator 13 and are inserted into the second active material layer 122. To ensure that the lithium ions can be inserted into the second active material layer 122 as much as possible and reduce risks of lithium plating, a width of the second active material layer 122 needs to be relatively large. Specifically, referring to FIG. 6, both ends of the second active material layer 122 in the height direction Z go beyond the first active material layer 112. In other words, along a direction pointing to the first tab 1112 from the first body portion 1111, one end of the second active material layer 122, which is close to the first tab 1112, goes beyond one end of the first active material layer 112, which is close to the first tab 1112. Along a direction pointing to the first body portion 1111 from the first tab 1112, the other end of the second active material layer 122, which is away from the first tab 1112, goes beyond the other end of the first active material layer 112, which is away from the first tab 1112.

Referring to FIG. 7, along the direction pointing to the first tab 1112 from the first body portion 1111, an end of the second active material layer 122 goes beyond a joint between the first part 113a and the first active material layer 112 but does not go beyond an end of the first part 113a, the end being away from the first active material layer 112.

Figure 12:
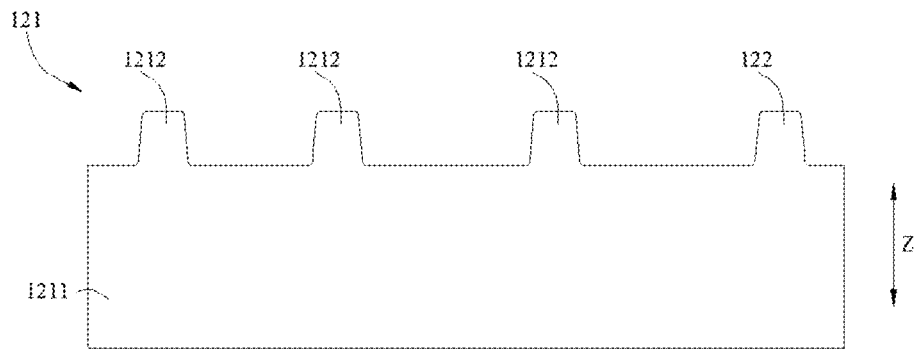
FIG. 12 is another schematic diagram of the second electrode plate shown in FIG. 11, with a second active material layer and a third active material layer being omitted.

Referring to FIG. 12, in a height direction Z, the end of the second active material layer 122 is flush with an end of the second body portion 1211. In a process of forming the second electrode plate 12, burrs may be generated at the end of the second body portion 1211. The burrs are likely to pierce the separator 13. In this embodiment of this application, the first part 113a can separate the burrs at the end of the second body portion 1211 from the first body portion 1111, thereby reducing short-circuit risks.

The second electrode plate 12 further includes a third active material layer 123. The third active material layer 123 is coated on a surface of the second tab 1212 and connected to the second active material layer 122. The second active material layer 122 and the third active material layer 123 are integrally formed.

Specifically, graphite, acetylene black as a conductive agent, a thickener (for example, carboxymethyl cellulose (CMC)), and a binder (for example, styrene butadiene rubber (SBR)) may be mixed. Deionized water is added as a solvent and stirred to form a negative slurry, and then the negative slurry is coated onto the surface of the second current collector 121. The negative slurry is cured to form a negative active material layer, and then the second tab 1212 is cut out. During the cutting, the cutter may directly exert an acting force on the negative active material layer. After completion of the cutting, a part of the negative active material layer, which remains on the second body portion 1211, is the second active material layer 122. A part of the negative active material layer, which remains on the second tab 1212, is the third active material layer 123. The cutting on the negative active material layer can reduce burrs at a cutting position and reduce risks of piercing the separator 13.

In the process of assembling the secondary battery, regions uncoated with the third active material layer 123 on a plurality of second tabs 1212 are tucked and welded to the second current collecting member 6. The third active material layer 123 possesses a relatively large elastic modulus, and can effectively support the second tabs 1212 and reduce risks of inserting the second tabs 1212 between the first electrode plate 11 and the second electrode plate 12.

In this embodiment of this application, the first tabs 1112 and the second tabs 1212 may be located on an identical side of the electrode assembly 1. Optionally, along a direction pointing to each first tab 1112 from the first body portion 1111, an end of the third active material layer 123, which is away from the second active material layer 122, goes beyond the end of the first part 113a, which is away from the first active material layer 112. This increases a distance between each region uncoated with the third active material layer 123 on the second tab 1212 and the first active material layer 112. In this case, even if the region uncoated with the third active material layer 123 on the second tab 1212 is bent inward, the first part 113a can still serve an insulating function and reduce the risks of contact between the second tab 1212 and the first active material layer 112.

Figure 13:
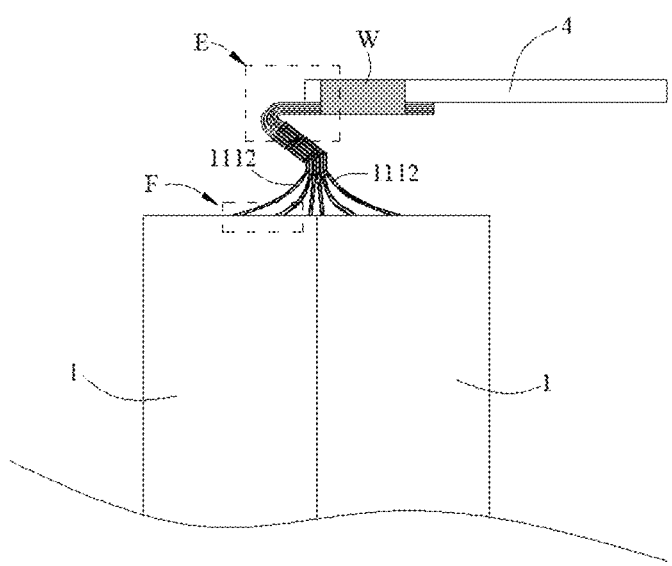
FIG. 13 is a schematic diagram after an electrode assembly is welded to a first current collecting member according to another embodiment of this application.
Figure 14:
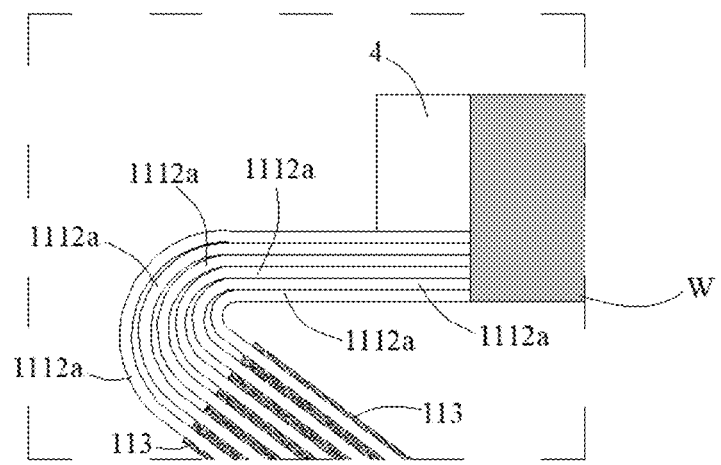
FIG. 14 is a local detailed view of a part E shown in FIG. 13.
Figure 15:
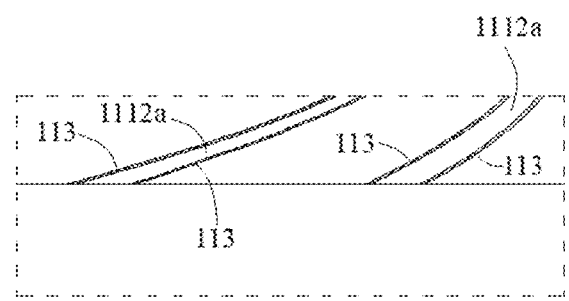
FIG. 15 is a local detailed view of a part F shown in FIG. 13.

The first tab 1112 is electrically connected to the first electrode terminal 3 by the first current collecting member 4. Referring to FIG. 13 and FIG. 14, the first tab 1112 is welded to the first current collecting member 4 and forms a weld region W. The first tab 1112 includes a connecting portion 1112a extending from one end of the first body portion 1111, and the connecting portion 1112a is connected between the weld region W and the first body portion 1111.

In the weld region W, a plurality of first tabs 1112 are fixed to the first current collecting member 4, thereby preventing risks of bending and deformation. Therefore, in the weld region W, no insulation layer 113 needs to be disposed on the surface of each first tab 1112. In addition, the insulation layer 113 disposed in the weld region W may affect strength of connection between the first tab 1112 and the first current collecting member 4. Therefore, in this embodiment of this application, the insulation layer 113 is at least partially coated on the connecting portion 1112a. The insulation layer 113 coated on the connecting portion 1112a is the second part 113b.

Along an extension direction of the first tab 1112, the insulation layer 113 is spaced apart from the weld region W. In other words, the region uncoated with the insulation layer 113 on the first tab 1112 is connected between the region coated with the insulation layer 113 on the first tab 1112 and the weld region W. This prevents the insulation layer 113 from interfering with the welding between the first tab 1112 and the first current collecting member 4.

Along the extension direction of the first tab 1112, a ratio of a length of a region coated with the insulation layer 113 in the connecting portion 1112a to a total length of the connecting portion 1112a is 0.3 to 0.9. If the ratio is less than 0.3, the region coated with the insulation layer 113 in the connecting portion 1112a is too short, and risks of short-circuit contact between the connecting portion 1112a and the second electrode plate 12 are still relatively high when the connecting portion 1112a is inserted between the first electrode plate 11 and the second electrode plate 12. If the ratio is greater than 0.9, a spacing between the insulation layer 113 and the weld region W is relatively small During welding, a high temperature is generated in the weld region W. If the spacing between the insulation layer 113 and the weld region W is too small, the insulation layer 113 is likely to be burned out, thereby reducing the strength of connection between the insulation layer 113 and the first tab 1112 and affecting insulation performance of the insulation layer 113.

Generally, the first tab 1112 is relatively long. To reduce a space occupied by the first tab 1112, the first tab 1112 may be bent according to this embodiment of this application. Optionally, referring to FIG. 14, the connecting portion 1112a is bent at a region uncoated with the insulation layer 113. At the region uncoated with the insulation layer 113, the connecting portion 1112a is bent to form two layers: an upper layer and a lower layer. The upper layer is substantially parallel to the first current collecting member 4, and the lower layer is bent toward a direction close to the first body portion 1111 against the upper layer.

Bending the connecting portion 1112a at the region uncoated with the insulation layer 113 can effectively reduce difficulty of the bending and simplify an assembly process. In addition, if the connecting portion 1112a is bent at the region coated with the insulation layer 113, a thickness of the insulation layer 113 will be superimposed in the height direction Z, thereby resulting in more space occupied by the insulation layer 113 in the height direction Z and reducing the energy density of the secondary battery.

A weight ratio of the inorganic filler to the binder is 4.1 to 8.2. If the ratio is greater than 8.2, the amount of the binder is relatively small, adhesion between the inorganic fillers and binding strength between the insulation layer 113 and the first current collector 111 may be insufficient, and the insulation layer 113 is likely to peel off when contacting the electrolytic solution. If the ratio is greater than 8.2, the elastic modulus of the insulation layer 113 will be too large, the region coated with the insulation layer 113 on the first tab 1112 is hardly bendable, thereby reducing the energy density of the secondary battery. If the ratio is less than 4.1, an insulation effect of the insulation layer 113 can hardly meet requirements, and the amount of the inorganic filler in the insulation layer 113 is relatively small. The inorganic filler is unable to effectively support the first tab 1112 during the winding of the first electrode plate 11, thereby causing risks of folding the first tab 1112.

The greater the elastic modulus of the insulation layer 113, the more difficult it is to bend the insulation layer. If the elastic modulus of the insulation layer 113 is too large, it is difficult to bend the region coated with the insulation layer 113 on the first tab 1112. The smaller the elastic modulus of the insulation layer 113, the lower the strength of the insulation layer. If the elastic modulus of the insulation layer 113 is too small, the insulation layer 113 is very likely to be pierced by impurities in the secondary battery, thereby resulting in insulation failure.

Likewise, the greater the thickness of the insulation layer 113, the higher the strength of the insulation layer, and the more difficult it is to bend the insulation layer. If the thickness of the insulation layer 113 is too large, the region coated with the insulation layer 113 on the first tab 1112 will be hardly bendable, and the insulation layer 113 will occupy too much space, thereby reducing the energy density of the secondary battery. The smaller the thickness of the insulation layer 113, the lower the strength of the insulation layer. If the thickness of the insulation layer 113 is too small, the insulation layer 113 is very likely to be pierced by the impurities in the secondary battery, thereby resulting in insulation failure.

Therefore, after the elastic modulus and the thickness of the insulation layer 113 are considered comprehensively, optionally, the elastic modulus of the insulation layer 113 is 5 MPa to 60 MPa, and the thickness of the insulation layer 113 is 10 μm to 60 μm.

In the process of assembling the secondary battery, the insulation layer 113 may be inserted between the first electrode plate 11 and the second electrode plate 12 together with the first tab 1112. Soaked in the electrolytic solution, the insulation layer 113 may expand. If a swelling ratio of the insulation layer 113 is too large, the swollen insulation layer 113 increases a spacing between the first active material layer 112 and the second active material layer 122, thereby prolonging a movement path of lithium ions and causing risks of lithium plating. In addition, if the swelling ratio of the insulation layer 113 is too large, the large expansion may reduce a binding force between the insulation layer 113 and the first tab 1112, thereby causing risks of peeling off the insulation layer 113 and resulting in insulation failure. Therefore, optionally, the swelling ratio of the insulation layer 113 is less than 50%.

In another embodiment of this application, the secondary battery described above may be referred to as a battery cell.

What is claimed is:

1. A battery cell, wherein the battery cell comprises an electrode assembly, a housing, and a first electrode terminal;
the housing comprises an accommodation cavity, the electrode assembly is accommodated in the accommodation cavity, and the first electrode terminal is disposed in the housing;
the electrode assembly comprises a first electrode plate and a second electrode plate;
the first electrode plate comprises a first current collector, a first active material layer, and an insulation layer; the first current collector comprises a first body portion and a first tab extending from the first body portion, the first active material layer is at least partially coated on a surface of the first body portion, and the first tab protrudes out of the first body portion and is electrically connected with the first electrode terminal; and
the insulation layer is at least partially coated on a surface of the first tab, and an elastic modulus of the insulation layer is less than an elastic modulus of the first tab;
wherein the insulation layer comprises a first part and a second part; the first part is coated on the surface of the first body portion and connected to an end of the first active material layer, the end of the first active material layer being close to the first tab; and the second part extends from an end of the first part and is coated on the surface of the first tab, the end of the first part being away from the first active material layer;
wherein the second electrode plate comprises a second current collector and a second active material layer, and the second current collector comprises a second body portion and a second tab extending from the second body portion;
the second active material layer is coated on a surface of the second body portion, and the second tab protrudes out of the second body portion;
wherein the second electrode plate further comprises a third active material layer, and the third active material layer is coated on a surface of the second tab and connected to the second active material layer;
the first tab and the second tab are located on an identical side of the electrode assembly;
along a direction pointing to the first tab from the first body portion, an end of the third active material layer, which is away from the second active material layer, goes beyond the end of the first part, which is away from the first active material layer;
along a direction pointing to the first tab from the first body portion, an end of the second active material layer goes beyond a joint between the first part and the first active material layer but does not go beyond an end of the first part, the end of the first part being away from the first active material layer; and
the first body portion comprises a main body region and a transition region, the transition region is located between the main body region and the first tab, the first active material layer is coated on a surface of the main body region, the first part is coated on a surface of the transition region, the first tab protrudes from the first body portion from an end of the transition region far away from the main body region, and a length of the second part is smaller than a length of the first part along a width direction, the width direction being perpendicular to a thickness direction of the first electrode plate and a direction in which the first tab protrudes from the first body portion.

2. The battery cell according to claim 1, wherein the number of the first tab is more than one, and the insulation layer is coated at root regions of both surfaces of each first tab, the root regions being close to the first body portion.

3. The battery cell according to claim 1, wherein
the housing comprises a housing body and a top cover plate, the housing body comprises an opening, the top cover plate is connected to the housing body and covers the opening of the housing body, and the first electrode terminal is disposed on the top cover plate;
the battery cell further comprises a first current collecting member, and the first tab is electrically connected to the first electrode terminal by the first current collecting member;
the first tab is welded to the first current collecting member and forms a weld region; the first tab comprises a connecting portion extending from one end of the first body portion, and the connecting portion is connected between the weld region and the first body portion; and
the insulation layer is at least partially coated on the connecting portion.

4. The battery cell according to claim 3, wherein, along an extension direction of the first tab, the insulation layer is spaced apart from the weld region.

5. The battery cell according to claim 4, wherein, along the extension direction of the first tab, a ratio of a length of a region coated with the insulation layer in the connecting portion to a total length of the connecting portion is 0.3 to 0.9.

6. The battery cell according to claim 3, wherein the connecting portion is bent at a region uncoated with the insulation layer.

7. The battery cell according to claim 1, wherein the elastic modulus of the insulation layer is 5 MPa to 60 MPa, and a thickness of the insulation layer is 10 μm to 60 μm.

8. The battery cell according to claim 1, wherein the insulation layer comprises an inorganic filler and a binder, and a weight ratio of the inorganic filler to the binder is 4.1 to 8.2.

9. The battery cell according to claim 1, wherein a swelling ratio of the insulation layer is less than 50%.

* * * * *